United States Patent
Shiao et al.

(10) Patent No.: US 8,394,498 B2
(45) Date of Patent: Mar. 12, 2013

(54) ROOFING GRANULES WITH HIGH SOLAR REFLECTANCE, ROOFING MATERIALS WITH HIGH SOLAR REFLECTANCE, AND THE PROCESS OF MAKING THE SAME

(75) Inventors: Ming Liang Shiao, Collegeville, PA (US); Jennifer A. Sharp, Bala Cynwyd, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 793 days.

(21) Appl. No.: 12/336,255

(22) Filed: Dec. 16, 2008

(65) Prior Publication Data

US 2010/0151199 A1  Jun. 17, 2010

(51) Int. Cl.
*B32B 5/16* (2006.01)
*B05D 7/00* (2006.01)

(52) U.S. Cl. ........ 428/403; 427/215; 427/218; 427/219; 427/220; 427/221; 428/144; 428/145; 428/147; 428/148; 428/206; 428/208; 428/323; 428/404; 428/405; 428/407

(58) Field of Classification Search .......... 428/403–406; 427/212–220
See application file for complete search history.

(56) References Cited

U.S. PATENT DOCUMENTS

| | | | |
|---|---|---|---|
| 2,379,358 A | 6/1945 | Jewett | |
| 2,417,058 A | 3/1947 | Buzzell et al. | |
| 2,591,149 A | 4/1952 | Grove | |
| 2,614,051 A | 10/1952 | Buzzell et al. | |
| 2,695,851 A | 11/1954 | Lodge | |
| 2,732,311 A * | 1/1956 | Hartwright | 427/186 |
| 2,898,232 A | 8/1959 | Miller et al. | |
| 2,927,045 A | 3/1960 | Lodge et al. | |
| 2,963,378 A | 12/1960 | Palmquist et al. | |
| 2,981,636 A | 4/1961 | Lodge et al. | |
| 2,986,476 A | 5/1961 | Larssen | |
| 3,255,031 A | 6/1966 | Lodge et al. | |
| 3,507,676 A | 4/1970 | McMahon | |
| 4,038,239 A | 7/1977 | Coyner et al. | |
| 4,092,441 A * | 5/1978 | Meyer et al. | 427/453 |
| 4,378,408 A | 3/1983 | Joedicke | |
| 4,583,486 A | 4/1986 | Miller | |
| 4,708,812 A | 11/1987 | Hatfield | |
| 4,710,426 A * | 12/1987 | Stephens | 428/336 |

(Continued)

FOREIGN PATENT DOCUMENTS

| | | |
|---|---|---|
| EP | 0003302 A | 8/1997 |
| JP | 61176501 A | 8/1986 |

(Continued)

OTHER PUBLICATIONS

Adobe Systems Inc., Technical Guides "Color Models, CIELAB" 2 Pgs., 2000.

(Continued)

*Primary Examiner* — Hoa (Holly) Le
(74) *Attorney, Agent, or Firm* — Paul & Paul

(57) ABSTRACT

Roofing granules include a core having an average ultraviolet transmission of greater than sixty percent and an average near infrared reflectance of greater than sixty percent and a UV coating layer on the exterior surface. The coating provides UV opacity, while the core provides near infrared reflectance.

36 Claims, 5 Drawing Sheets

U.S. PATENT DOCUMENTS

| | | | |
|---|---|---|---|
| 4,717,614 | A | 1/1988 | Bondoc et al. |
| 4,916,014 | A | 4/1990 | Weber et al. |
| 5,194,113 | A | 3/1993 | Lasch et al. |
| 5,240,760 | A | 8/1993 | George et al. |
| 5,310,803 | A | 5/1994 | Hansen |
| 5,356,664 | A | 10/1994 | Narayan et al. |
| 5,380,552 | A | 1/1995 | George et al. |
| 5,411,803 | A | 5/1995 | George et al. |
| 5,427,793 | A | 6/1995 | Bigham et al. |
| 5,456,785 | A | 10/1995 | Venable |
| 5,484,477 | A | 1/1996 | George et al. |
| 5,514,350 | A | 5/1996 | Kear et al. |
| 5,516,573 | A | 5/1996 | George et al. |
| 5,541,350 | A | 7/1996 | Murata et al. |
| 5,571,596 | A | 11/1996 | Johnson |
| 5,573,782 | A | 11/1996 | Bigham et al. |
| 5,595,813 | A | 1/1997 | Ogawa et al. |
| 5,620,554 | A | 4/1997 | Venable |
| 5,643,399 | A | 7/1997 | Venable |
| 5,723,516 | A | 3/1998 | Bigham et al. |
| 5,731,369 | A | 3/1998 | Mahoney |
| 5,770,295 | A | 6/1998 | Alderman |
| 5,783,506 | A | 7/1998 | Eppler et al. |
| 5,795,389 | A | 8/1998 | Koschitzky |
| 5,840,111 | A | 11/1998 | Wiederhoft et al. |
| 5,876,683 | A | 3/1999 | Glumac et al. |
| 5,928,761 | A | 7/1999 | Hedblom et al. |
| 5,962,143 | A | 10/1999 | Krauthauser et al. |
| 6,037,289 | A | 3/2000 | Chopin et al. |
| 6,063,312 | A | 5/2000 | Mannheimer |
| 6,124,466 | A | 9/2000 | Matsuno et al. |
| 6,143,318 | A | 11/2000 | Gilchrist et al. |
| 6,156,245 | A | 12/2000 | Takebayashi et al. |
| 6,174,360 | B1 | 1/2001 | Sliwinski et al. |
| 6,214,466 | B1 | 4/2001 | Joedicke |
| 6,217,252 | B1 | 4/2001 | Tolliver et al. |
| 6,245,381 | B1 | 6/2001 | Israel |
| 6,245,850 | B1 | 6/2001 | Fields |
| 6,296,912 | B1 | 10/2001 | Zickell |
| 6,355,309 | B1 | 3/2002 | Fleming et al. |
| 6,362,121 | B1 | 3/2002 | Chopin et al. |
| 6,366,397 | B1 | 4/2002 | Genjima et al. |
| 6,376,075 | B1 | 4/2002 | Tacke-Willemsen et al. |
| 6,426,309 | B1 | 7/2002 | Miller et al. |
| 6,446,402 | B1 | 9/2002 | Byker et al. |
| 6,451,874 | B1 | 9/2002 | Purgett et al. |
| 6,454,848 | B2 | 9/2002 | Sliwinski et al. |
| 6,465,088 | B1 | 10/2002 | Talpaert et al. |
| 6,500,555 | B1 | 12/2002 | Khaldi |
| 6,502,360 | B2 | 1/2003 | Carr, III et al. |
| 6,521,038 | B2 | 2/2003 | Yanagimoto et al. |
| 6,533,961 | B2 | 3/2003 | Harelstad et al. |
| 6,537,703 | B2 | 3/2003 | DuPasquier et al. |
| 6,548,145 | B2 | 4/2003 | Joedicke |
| 6,569,520 | B1 | 5/2003 | Jacobs |
| 6,572,784 | B1 | 6/2003 | Coombs et al. |
| 6,596,070 | B1 | 7/2003 | Schmidt et al. |
| 6,599,355 | B1 | 7/2003 | Schmidt et al. |
| 6,607,781 | B2 | 8/2003 | Joedicke |
| 6,610,135 | B1 | 8/2003 | Ohmori et al. |
| 6,610,147 | B2 | 8/2003 | Aschenbeck |
| 6,647,688 | B1 | 11/2003 | Gaitan et al. |
| 6,653,356 | B2 | 11/2003 | Sherman |
| 6,680,134 | B2 | 1/2004 | Maurer et al. |
| 6,692,824 | B2 | 2/2004 | Benz et al. |
| 6,703,127 | B2 | 3/2004 | Davis et al. |
| 6,797,277 | B2 | 9/2004 | Heier et al. |
| 6,861,145 | B2 | 3/2005 | Nastke et al. |
| 6,881,702 | B2 | 4/2005 | Arnold et al. |
| 6,905,698 | B1 | 6/2005 | Aldcroft et al. |
| 6,933,007 | B2 | 8/2005 | Fensel et al. |
| 7,132,143 | B2 | 11/2006 | Zanchetta et al. |
| 7,176,245 | B2 | 2/2007 | Stucky et al. |
| 7,238,408 | B2 | 7/2007 | Aschenbeck et al. |
| 7,241,500 | B2 * | 7/2007 | Shiao et al. ............ 428/402 |
| 7,422,989 | B2 * | 9/2008 | Kalkanoglu et al. ............ 442/74 |
| 7,652,736 | B2 * | 1/2010 | Padiyath et al. ............ 349/115 |
| 7,811,630 | B2 * | 10/2010 | Hong et al. ............ 427/212 |
| 2002/0092596 | A1 | 7/2002 | Phillips et al. |
| 2002/0160151 | A1 | 10/2002 | Pinault et al. |
| 2003/0035972 | A1 | 2/2003 | Hanson et al. |
| 2003/0044525 | A1 | 3/2003 | Aschenbeck |
| 2003/0068469 | A1 | 4/2003 | Aschenbeck et al. |
| 2003/0091795 | A1 | 5/2003 | Kiik et al. |
| 2003/0091814 | A1 | 5/2003 | Benz et al. |
| 2003/0152747 | A1 | 8/2003 | Fensel et al. |
| 2003/0203145 | A1 | 10/2003 | Zanchetta et al. |
| 2003/0219563 | A1 | 11/2003 | Zanchetta et al. |
| 2004/0076826 | A1 | 4/2004 | Lee |
| 2004/0110639 | A1 | 6/2004 | Joedicke |
| 2004/0170806 | A1 | 9/2004 | Hittle et al. |
| 2004/0255548 | A1 | 12/2004 | Hong et al. |
| 2004/0258835 | A1 | 12/2004 | Hong et al. |
| 2005/0053745 | A1 | 3/2005 | Bartek et al. |
| 2005/0053746 | A1 | 3/2005 | Bartek |
| 2005/0064175 | A1 | 3/2005 | Azari et al. |
| 2005/0072110 | A1 | 4/2005 | Shiao et al. |
| 2005/0072114 | A1 | 4/2005 | Shiao et al. |
| 2005/0074580 | A1 * | 4/2005 | Gross et al. ............ 428/143 |
| 2006/0110996 | A1 | 5/2006 | Getlichermann et al. |
| 2006/0243388 | A1 | 11/2006 | Kubiak et al. |
| 2006/0251807 | A1 | 11/2006 | Hong et al. |
| 2007/0065640 | A1 | 3/2007 | Joedicke |
| 2007/0065641 | A1 | 3/2007 | Joedicke |

FOREIGN PATENT DOCUMENTS

| | | |
|---|---|---|
| JP | 2004162482 | 6/2004 |

OTHER PUBLICATIONS

Adobe Systems Inc., Technical Guides "Color Models, The CIE Color Models," 2 pgs., 2000.

Adobe Systems Inc., Technical Guides "Color Models, CIEXYZ," 2 pgs., 2000.

Adobe Systems Inc., Technical Guides Color Models, The Munsell Color System, 4 pgs., 2000.

BASF Aktiengesellschaft, "Product Specification, SIXOLUX Metal Gloss L 6015," 1 pg. Sep. 18, 2002.

BASF Aktiengessellschaft, "Product Specification, SIXOLUX Coppen Gloss L 3015," 1 pg., Sep. 18, 2002.

BASF Corporation, "BASF launches two new pgiments for tile coatings" by BASF Corporation, 1 pg., 1998-2003.

Ferro Corporation, "Cool Colors & Eclipse heat and Energy Saving Pigments," 2 pgs., 1999-2003.

Ferro Corporation, "How Cool Colors & EclipseWork," 3 pgs., 2003.

Gifty Osel-Prempel, et al. "Synthesis and Application of Flurocarbon Funcationalized Mesoporous Silica" Materkals Engineering and Sciences Division # 574,2006.

H.Akabari, "Cool Colored Materials for Roofs," Lawrence Radiation Laboratory, presented at Emerging Technologies in Energy Efficiency-Summit 2004, San Francisco, Oct. 14, 2004.

L. Sung, et al., "Characterization of Coating Microstructure Using Laser Scanning Confocal Microscopy," Polymer Materials, Science and Engineering, 83, 343-344, 2000.

Ming-Zhi, et al., "A novel fabrication of meso-porous silica film by sol-gel of TEOS," Journal of Zhejiang University Science, 442-427, 2004.

Project Advisory Committee Meeting, "Development of Cool Colored Roofing Materials," Oak Ridge National Laboratory and Livermore Berkeley National Laboratory, 55 pgs., Mar. 11, 2003.

Qingyuan Hu, "Synthesis and Characterization of Functionalized Mesoporous Silica by Aerosol-Assisted Self-Assembly," Chemical & Biomolecular Engineering, # 574 2006.

Rhonda Stroud, Silica Sol as 'Nanogule', Naval Research Laboratory, American Physical Society, Mar. 2000.

Silberline Manufacturing Co., Inc., "StarBrite," 1 pg., 2003.

T. A. Germer, et al "Modeling the appearance of special effect pigment coatings," Surface Scattering and Diffraction for Advance Metrology, Proc., SPIE 4447, 77-96, 2001.

T. A. Germer, et al., "Modeling the appearance of special effect Variable Security Inks Including Polarizing Cholesteric Liquid Crystal (CLC) Polymers," Optical Security and Counterfeit Deterrence Techniques IV, SPIE 4677, 2000.

Y. Jiang, et al, "Novel Pigment Approaches in Optically Variable Security Inks Including polarizing Cholesteric Liquid Crystal (CLC) Polymers," Optical Security and Counterfeit Deterrence Techniques IV, SPIE 4677, 2000.

* cited by examiner

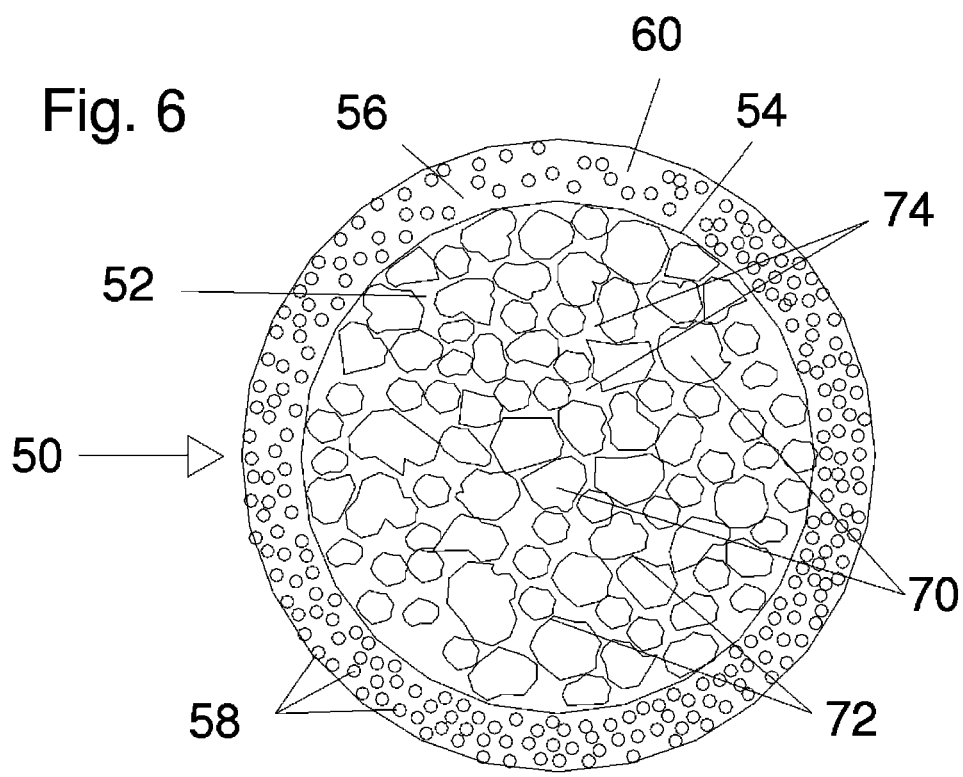
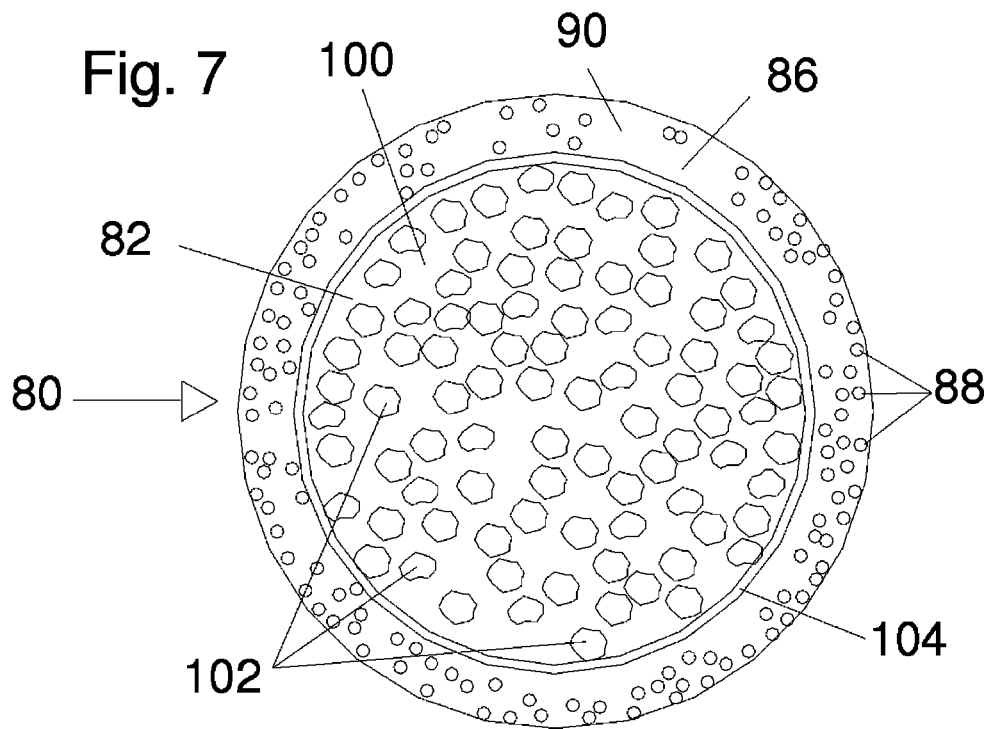

ROOFING GRANULES WITH HIGH SOLAR REFLECTANCE, ROOFING MATERIALS WITH HIGH SOLAR REFLECTANCE, AND THE PROCESS OF MAKING THE SAME

BACKGROUND OF THE INVENTION

1. Field of the Invention

The present application relates to roofing granules and roofing products including roofing granules, such as roofing shingles, and to processes for making such roofing granules.

2. Brief Description of the Prior Art

Asphalt shingles are conventionally used in the United States and Canada as roofing and siding materials. Mineral surfaced asphalt shingles, such as those described in ASTM D225 or D3462, are generally used in steep-sloped roofs to provide water-shedding function while adding aesthetically pleasing appearance to the roofs. The asphalt shingles are generally constructed from asphalt-saturated roofing felts and surfaced with pigmented color granules, such as those described in U.S. Pat. No. 4,717,614. Roofing granules are typically distributed over the upper or outer face of such shingles. The roofing granules, in general are formed from crushed and screened mineral materials, and serve to provide the shingle with durability. They protect the asphalt from the effects of the solar radiation, in particular from the degradative effects of ultraviolet rays, and of the environment, including wind, precipitation, pollution, and the like, and contribute to better reflection of incident radiation. The granules moreover are typically colored, naturally or artificially by way of the application of pigments, to meet the aesthetic requirements of the user. Roofing granules typically are subsequently coated with a binder containing one or more coloring pigments, such as suitable metal oxides.

The mineral particles typically used for making roofing granules, such as talc, slag, limestone, granite, syenite, diabase, greystone, slate, trap rock, basalt, greenstone, andesite, porphyry, rhyolite, and greystone, generally have low solar heat reflectance, that is, low reflectance of near infrared radiation. Further, the pigments employed for coloring roofing granules have usually been selected to provide shingles having an attractive appearance, with little thought to the thermal stresses encountered on shingled roofs. As a result, the colored roofing granules themselves typically have low solar heat reflectance.

Other mineral particles, such as calcite, feldspar, quartz, white rock, plagioclase, or zeolite, may have high solar heat reflectance; however, they are less opaque to UV radiation and hence are not suitable for roofing granules. Other types of highly reflective synthetic particles, such as aluminum oxide, recycled ceramic particle, ceramic grog, or porous silica, are also less opaque to UV radiation and will not be suitable for roofing granules for asphalt-based roofing membranes.

The binder for the coating applied to color roofing granules can be a soluble alkali metal silicate that is subsequently insolubilized by heat or by chemical reaction, such as by reaction between an acidic material and the alkali metal silicate, resulting in an insoluble colored coating on the mineral particles. For example, U.S. Pat. No. 1,898,345 to Deming discloses coating a granular material with a coating composition including a sodium silicate, a coloring pigment, and a colloidal clay, and heating below the fusing temperature of sodium silicate, and subsequently treating with a solution, such as a solution of calcium or magnesium chloride, or aluminum sulphate, that will react with the sodium silicate to form an insoluble compound. Similarly, U.S. Pat. No. 2,378,927 to Jewett discloses a coating composition for roofing granules consisting of sodium silicate, and clay or another aluminum-bearing compound such as sodium aluminate, or cryolite or other insoluble fluorides such as sodium silicofluoride, and a color pigment. The coating is then heat cured at a temperature above the dehydration temperature of the coating materials but below the fusion temperature at which the combination of materials fuses, thus producing a non-porous, insoluble weather-resistant cement. Roofing granules are typically produced using inert mineral particles with metal-silicate binders and clays as a latent heat reactant at an elevated temperature, for example, such as those described in U.S. Pat. No. 2,981,636. The granules are employed to provide a protective layer on asphaltic roofing materials such as shingles, and to add aesthetic values to a roof.

Depending on location and climate, shingled roofs can experience very challenging environmental conditions, which tend to reduce the effective service life of such roofs. One significant environmental stress is the elevated temperature experienced by roofing shingles under sunny, summer conditions, especially roofing shingles coated with dark colored roofing granules. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Asphalt shingles coated with conventional roofing granules are known to have low solar heat reflectance, and hence will absorb solar heat especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can only have solar reflectance of 5-15%. Furthermore, except in the white or very light colors, there is typically only a very small amount of pigment in the conventional granule's color coating that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called heat-island effects and increase the cooling load to its surroundings. It is therefore advantageous to have roofing shingles that have high solar reflectivity in order to reduce the solar heat absorption. The surface reflectivity of an asphalt shingle largely depends on the solar reflectance of the granules that are used to cover the bitumen.

In recent years, the state of California has implemented a building code requiring low-sloped roofs to have roof coverings with solar reflectance greater than 70%. To achieve such high levels of solar reflectance, it is necessary to coat the roof with a reflective coating over granulated roofing products, since the granules with current coloring technology are not capable of achieving such high levels of solar reflectance. However, polymeric coatings applied have only a limited amount of service life and will require re-coat after several years of service. Also, the cost of adding such a coating on roof coverings can be relatively high.

In order to reduce the solar heat absorption, one may use light colored roofing granules which are inherently more reflective towards the solar radiation. White pigment containing latex coatings have been proposed and evaluated by various manufacturers. However, consumers and homeowners often prefer darker or earth tone colors for their roof. In recent years, there have been commercially available roofing granules that feature a reflective base coat (i.e., a white coat) and a partially coated top color coat allowing the reflective base coat to be partially revealed to increase solar reflectance. Unfortunately, these granules have a "washed-out" color appearance due to the partially revealed white base coat.

Other manufacturers have also proposed the use of exterior-grade coatings that were colored by infrared-reflective pigments for deep-tone colors and sprayed onto the roof in the field. U.S. Patent Application Publication No. 2003/0068469 A1 discloses an asphalt-based roofing material comprising mat saturated with an asphalt coating and a top coating having a top surface layer that has a solar reflectance of at least 70%. U.S. Patent Application Publication No. 2003/0152747 A1 discloses the use of granules with solar reflectance greater than 55% and hardness greater than 4 on the Moh's scale to enhance the solar reflectivity of asphalt based roofing products. However, there is no control of color blends and the novel granules are typically available only in white or buff colors. U.S. Pat. No. 7,455,899 discloses a non-white construction surface comprising a first reflective coating and a second reflective coating with total direct solar reflectance of at least 20%.

Also, there have been attempts in using special near-infrared-reflective pigments in earth-tone colors to color roofing granules for increased solar reflectance. However, the addition of kaolin clays, which are used to make the metal-silicate binder durable through heat curing, inevitably reduces the color strength or the color intensity of the pigment.

Colored roofing granules can also be prepared using a metal silicate binder without adding clay and curing the binder at temperatures greater than the glass sintering temperature, or through a "pickling" process by applying acid. However, these alternatives require either very high temperatures, or the use of corrosive chemicals, and in many cases could result in loss of color due to pigment degradation by the acid.

In the alternative, a non-silicate binder, such as a synthetic polymeric binder, can be used to coat the inert mineral materials in order to produce roofing granules with dark colors and high solar reflectance. However, the long-term durability and cost for polymeric coatings are not as advantageous as the silicate binders.

Another approach is provided by solar control films that contain either thin layer of metal/metal oxides or dielectric layers through vacuum deposition, and which have been commercially available for use in architectural glasses.

There is a continuing need for roofing materials, and especially asphalt shingles, that have improved resistance to thermal stresses while providing an attractive appearance, and providing good resistance to the degradative effects of ultraviolet radiation.

SUMMARY OF THE INVENTION

In one aspect, the present invention provides roofing granules, which have high near infrared or solar heat reflectance, such as at least sixty percent, as well as high ultraviolet opacity, and roofing products such as shingles provided with such near infrared-reflective roofing granules. The present invention also provides a process for preparing near infrared-reflective roofing granules.

When used to prepare bituminous roofing products such as asphalt shingles, roofing granules according to the present invention reflect solar heat by virtue of the near infrared-reflective cores while blocking ultraviolet radiation to protect the underlying asphalt substrate in which they are embedded.

Preferably, the roofing granules have an average particle size from about 0.1 mm to 3 mm, and more preferably from about 0.5 mm to 1.5 mm.

The present invention employs inert mineral particles that have a high reflectance in the near infrared portion of the solar spectrum to serve as granule cores or as particulate components of such cores.

In one aspect of the present invention, the exterior surface of the cores is coated with a UV coating composition having a high opacity to ultraviolet radiation and high transparency to near infrared radiation to form a coating layer on the cores to provide the roofing granules. Preferably, the UV coating composition is applied to provide a covering effective to confer high opacity to UV radiation. In order to achieve high UV opacity, it is preferred that the UV coating composition be applied to provide a coating covering at least 90 percent, and more preferably at least 95 percent, of the surface area of the cores. Most preferably, the UV coating composition is applied to the surface of the cores to from a UV coating which completely covers the surface area or encapsulates of the cores.

In another aspect of the present invention, the cores themselves also provide high opacity of ultraviolet radiation. In this aspect, the cores comprise an agglomerate including base particles which have low opacity to ultraviolet radiation and a binder which has high opacity to ultraviolet radiation. In this aspect, the base particles have an average near infrared reflectance of greater than about 60 percent, and the agglomerate binder has an average transmission in the near infrared and visible ranges of the electromagnetic spectrum of greater than about 60 percent.

When a UV coating layer is employed, the UV coating layer that is formed from the UV coating composition preferably has an average ultraviolet transmission of less than ten percent and an average near infrared transmission of greater than sixty percent. In this aspect, the cores can have an ultraviolet transmission of greater than sixty percent, and preferably have a near infrared reflectance of greater than sixty percent.

In one aspect of the present embodiment, the UV coating layer has an average transmission in the visible range of greater than sixty percent.

The UV coating layer can comprise a coating binder and, optionally, at least one material dispersed in the coating binder. The ultraviolet opacity of the UV coating layer can be provided by the coating binder, by the at least one material dispersed in the coating binder, or by a combination thereof. Preferably, the at least one material is an ultraviolet absorber selected from the group consisting of organic or inorganic ultraviolet absorbing compounds, organic or inorganic ultraviolet absorbing particles, and insoluble ultraviolet absorbing pigments.

Preferably, in one aspect of the present invention the ultraviolet absorbing inorganic particles comprise micronized titanium dioxide, micronized zinc oxide, and micronized cerium oxide. In another aspect, the insoluble ultraviolet absorbing inorganic particles comprise titanium oxide nanoparticles, zinc oxide nanoparticles, iron oxide nanoparticles, and cerium oxide nanoparticles.

Thus, in one aspect of the present invention, the inorganic ultraviolet absorbing compounds or particles comprise nanoparticles of metal oxides. Preferably, the nanoparticles of metal oxides comprise titanium oxide, zinc oxides, iron oxides, cerium oxides, or their combination. Preferably, the nanoparticles have particle sizes sufficiently small enough to have greater than 60% transparency in visible light spectrum.

In one aspect of the present invention, the organic ultraviolet absorbing particles preferably comprise micronized 2,2'-methylenebis[6-(2H-benzotriazol-2-yl)-4-(1,1,3,3-tetramethylbutyl)phenol].

In one aspect of the present invention, the inorganic ultraviolet absorbing compounds or particles comprise nanoparticles of metal oxides. Preferably, the nanoparticles of metal oxides comprise titanium oxide, zinc oxides, iron oxides, cerium oxides, or their combination. Preferably, the nanoparticles have particle sizes sufficiently small enough to have greater than 60% transparency in visible light spectrum.

In another aspect, the organic ultraviolet absorbing compound is preferably selected from the class consisting of triazines, benzotriazoles, benzophenones, vinyl-group containing amides, cinnamic acid amides, and sulfonated benzimidazoles.

In yet another aspect, the at least one organic ultraviolet absorbing compound comprises at least one ultraviolet A absorber and at least one ultraviolet B absorber. Preferably, the at least one ultraviolet A absorber is selected from the group consisting of butyl methoxydibenzoylmethane, 5-methyl-2-(1-methylethyl)cyclohexanol-2-aminobenzoate, bis [7,7-dimethyl-oxo-]terephthalylidene dicamphor sulfonic acid, methylene bis-benzotriazolyl tetramethylbutylphenol, Preferably, the at least one ultraviolet B absorber is selected from the group consisting of octyl methoxycinnamate, 2-benzoyl-5-methoxyphenol, ethylhexyl salicylate, 2-cyano-3,3-diphenyl acrylic acid, 3,3,5-trimethylcyclohexanol salicylate, phenylbenzimazole sulfonic acid, 2-ethylhexyl-4-dimethylamino benzoate, 2-hydroxy-4-methoxybenzophenone-5-sulfonic acid, p-aminobenozic acid.

Many types of natural and synthetic inert materials have high transmittance for ultraviolet radiation, making them unsuitable, per se, for bituminous roofing applications. Examples of such materials include, but not limited to, naturally occurring minerals such as calcite, white rock, plagioclase, quartz, zeolite, limestone or marble; synthetic particles such as refractory grog, crushed porcelain, alumina; silica, and silica gel. In some cases, however, these same materials have high solar heat or near infrared reflectance, may be due to the presence of porosity, since the presence of air/matrix interface will result in refraction and scattering of incident radiation.

As roofing granule cores, the present invention makes use of materials that have high transparency to ultraviolet radiation and that otherwise would be disfavored in preparing roofing granules for bituminous roofing products. In particular, such ultraviolet transparent cores are formed from at least one material selected from the group consisting of calcite, white rock, plagioclase, quartz, zeolite, limestone, marble, refractory grog, crushed porcelain, alumina, porous silica and silica gel. Suitable cores for preparing the roofing granules of the present invention can be prepared by comminuting and screening such materials to provide an average size suitable for roofing granules. Preferably, the cores have an average particle size from about 0.1 millimeter to 2 millimeters, and more preferably from about 0.4 mm to 1.5 mm. In some cases, the cores can comprise porous inorganic material having an average pore size from about 100 to 2500 nm. Preferably, the porous inorganic material comprising the cores has an average pore volume of from about 10 to 50 percent. Alternatively, suitable cores can be prepared by comminuting suitable minerals to an average size less than that suitable for use in roofing granules to thus form small particles, and subsequently agglomerating these small particles to form cores.

Preferably, the agglomerated cores include voids effective to scatter near infrared radiation. In the alternative, the agglomerated core can comprise particles having different refractive indices, or particles having phases, such as crystalline phases, having different refractive indices, such that phase interfaces or particle boundaries are effective to scatter near infrared radiation.

A core binder can be included to provide mechanical strength to the agglomerated particles forming the cores. The core binder is preferably selected from the group consisting of silicate, silica, phosphate, titanate, zirconate, and aluminate binders, and mixtures thereof. In one aspect, the core binder preferably further comprises an inorganic material selected from the group consisting of aluminosilicate and kaolin clay.

While it is anticipated that a substantial portion of the near infrared reflectivity of the roofing granules of the present invention will be provided by the core and the intracore interfaces (that is, interfaces within the cores), such as the interfaces between particles and voids in the granule cores, the near infrared reflectivity can be enhanced by including at least one near infrared-reflective material. For example, at least one near infrared-reflective material can be included in the UV coating. Similarly, when formed from agglomerate, the cores can also include at least one near infrared-reflective material. In one presently preferred embodiment, the ultraviolet opacity of the agglomerated cores results largely from the at least one near infrared-reflective material rather than from scattering from intracore interfaces, such as the interfaces between particles and voids. Alternatively, at least one near infrared-reflective material can be included in a separate coating layer applied over the UV coating or under the UV coating. Preferably, the near infrared-reflective material is selected from the group consisting of titanium dioxide, zinc oxide, metal pigments, titanates, and metal reflective pigments. In one presently preferred embodiment, the roofing granules further include a near infrared-reflective coating layer. Preferably, the near infrared reflecting coating layer comprises a metal film.

The present invention also provides colored roofing granules. In addition to the effective UV resistance and near infrared reflectance, the roofing granules of the present invention can include at least one colorant, preferably a color pigment, to provide a desired appearance in the visible range. Preferably, at least one color pigment is dispersed in the UV coating layer. Preferably, the at least one color pigment has an average transmission of at least sixty percent in the near infrared range of the electromagnetic spectrum. Preferably, the at least one color pigment has an average ultraviolet transmission of less than ten percent.

In addition, or in the alternative, the at least one colorant can be dispersed in a suitable binder to form a color coating composition to form a color coating layer. A color coating can be applied over the UV coating layer or under the UV coating layer. When a near infrared-reflective material is employed, the at least one colorant can be included with near infrared-reflective material in the UV coating, or in a separate coating layer over or under the UV coating.

In one aspect, roofing granules of the present invention further include at least one biocide. The UV coating layer can include the at least one biocide. The roofing granules of the present invention can further include an additional coating layer, the additional coating layer including the at least one biocide.

The UV coating composition forming the UV coating layer can include a binder preferably selected from the group consisting of metal silicate, phosphate, silica, acrylate, polyurethane, silicone, fluoropolymer and polysilazane.

By applying a UV coating that is both opaque to ultraviolet radiation and transparent to near infrared radiation according to the present invention, such mineral particles are rendered suitable for roofing applications, and yet still maintain their high near infrared reflectance properties.

In another aspect, the present invention provides a coating process for the UV coating to encapsulate the mineral particles such that the UV coating will cover at least 90 percent of the surface area of the particles, and more preferably at least 95 percent of the surface area of the particles, to provide adequate UV opacity. Most preferably, the particles are completely encapsulated by the UV coating.

Roofing granules according to the present invention can be employed to prepare bituminous roofing products, such as shingles and roll roofing material products.

In another aspect, the present invention provides a process for preparing roofing granules. The process includes providing cores having an average ultraviolet transmission of greater than sixty percent and an average solar reflectance of greater than sixty percent, the core having an exterior surface. In one aspect, the process further includes applying a UV coating composition on the exterior surface of the cores, and curing the UV coating composition to provide a coating on the exterior surface of the cores to form a UV coating layer. The UV coating preferably has an average ultraviolet transmission of less than ten percent and an average near infrared transmission of greater than sixty percent. In one aspect, the process further includes agglomerating ultraviolet transparent base particles to form cores. The base particles are optionally agglomerated using a binder, and the binder can provide UV opacity to the cores. In another aspect, the process also includes providing ultraviolet transparent mineral particle grains, and applying a color coating to the grains to form cores. Preferably, the UV coating is applied uniformly to the surface of the exterior surface of the cores, such as by a fluidized bed technique.

BRIEF DESCRIPTION OF THE DRAWINGS

FIG. 6 is a schematic sectional elevational representation of a roofing granule according to a third embodiment of the present invention.

FIG. 7 is a schematic sectional elevational representation of a roofing granule according to a fourth embodiment of the present invention.

DETAILED DESCRIPTION

Figure 1:
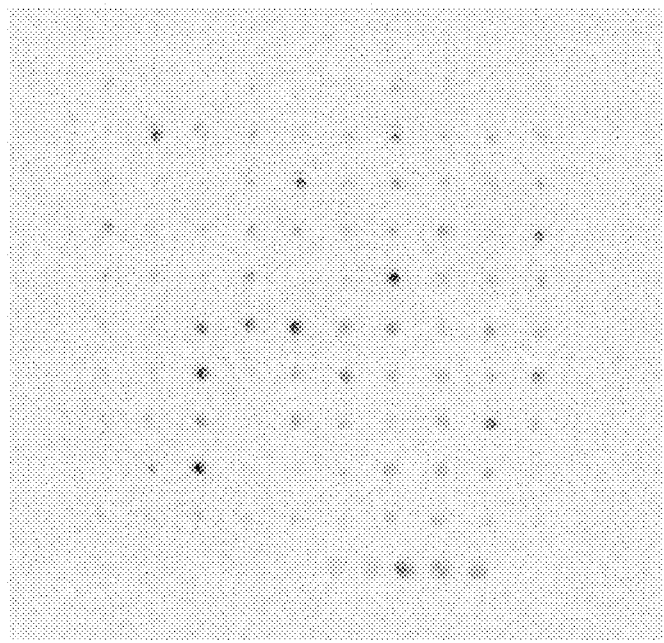
FIG. 1 is a reproduction of the results of a UV opacity test for a sample of roofing granules prepared according to the prior art.

The present invention provides roofing granules which have high near infrared reflectance as well as high opacity to solar ultraviolet radiation, and roofing products such as shingles provided with such near infrared-reflective roofing granules. The present invention also provides a process for preparing these near infrared-reflective roofing granules. Inert mineral particles are employed as cores for the roofing granules. The inert mineral particles preferably have a high reflectance in the near infrared portion of the solar spectrum. The exterior surface of the cores is coated with a UV coating composition having a high opacity to ultraviolet radiation and, preferably, high transparency to near infrared radiation, to form a coating layer on the cores.

As used in the present specification and claims, "near infrared-reflective," and "solar heat-reflective" refer to reflectance in the near infrared range (700 to 2500 nanometers) of the electromagnetic spectrum. "Visible" refers to the visible range of the electromagnetic spectrum (400 to 700 nm). "Ultraviolet" and "UV" refer to the ultraviolet range (10 to 400 nanometers) of the electromagnetic spectrum. "UVA" refers to the portion of the spectrum having wavelengths from 315 to 400 nanometers. "UVB" refers to the portion of the spectrum having wavelengths from 280 to 315 nanometers. As used in the present specification and claims, the "opacity" of an object or medium refers to the extinction of incident radiation by the object or medium and is the sum of the absorption of incident radiation and the scattering of incident radiation. As used in the present specification and claims, "about" means plus or minus five percent or less. As used in the present specification and claims, "encapsulate" means to cover completely, that is, to cover 100 percent of the surface.

As used in the present specification and claims, "solar reflective functional pigment" denotes a pigment selected from the group consisting of light-interference platelet pigments including mica, light-interference platelet pigments including titanium dioxide, mirrorized silica pigments based upon metal-doped silica, metal flake pigments, metal oxide coated flake pigments, and alumina. As used in the present specification and claims, "granule coloring pigment" denotes a conventional metal oxide-type pigment employed to color roofing granules. As used in the present specification and claims, the strength in color space E* is defined as $E^*=(L^{*2}+a^{*2}+b^{*2})^{1/2}$, where L*, a*, and b* are the color measurements for a given sample using the 1976 CIE L*a*b* color space. The total color difference ΔE* is defined as $\Delta E^*=(\Delta L^{*2}+\Delta a^{*2}+\Delta b^{*2})^{1/2}$ where ΔL*, Δa*, and Δb* are respectively the differences in L*, a* and b* for two different color measurements.

Preferably, the present invention provides highly reflective, solid, durable, and crush-resistant granules suitable for roofing applications with the sizes ranging from −10 to +40 U.S. mesh.

Preferably, the solar heat reflective roofing granules according to the present invention have a solar reflectance of at least about 60 percent, and more preferably at least about 70 percent.

The mineral particles employed in the process of the present invention are preferably chemically inert materials. The mineral particles preferably have an average particle size of from about 0.1 mm to about 2 mm, and more preferably from about 0.4 mm to about 1.5 mm. In some embodiments, the mineral particles employed are agglomerated particles of smaller dimensions.

Bituminous organic materials, such as those employed in preparing waterproof roofing shingles and roll roofing materials, are sensitive to degradation from exposure to ultraviolet radiation. Many types of natural and synthetic inert materials have high transmittance for ultraviolet radiation, making them unsuitable or less desirable for bituminous roofing applications for this reason than other types of inorganic materials. Examples of materials which have undesirably low opacity to ultraviolet radiation include, but are not limited to, naturally occurring minerals such as calcite, white rock, plagioclase, quartz, zeolite, limestone or marble, and other minerals including substantial proportions of silica; synthetic particles such as refractory grog, crushed porcelain, alumina; silica, and silica gel. In some cases, however, these same materials have desirable high solar heat or near infrared reflectance. This near infrared reflectance can result from porosity.

The presence of an air/matrix interface at the pores and concomitant difference in refractive index results in refraction and scattering of incident radiation. Depending on the physical characteristics of the pores, incident near infrared radiation can be scattered rendering the porous material opaque. To effectively scatter the incident near infrared radiation, the average pore size is preferably on the order of the wavelength of the incident near infrared radiation. Interfaces between materials having different refractive indices effective to scatter near infrared radiation can be provided according to the present invention in other ways. For example, the cores can comprise a material having different phases, such as different crystalline phases or one or more crystalline phase and an amorphous phase, each phase having a different refractive index, such that the scattering of incident near infrared radiation occurs at the interface between the phases. Alternatively, the cores can include a plurality of discrete particles agglomerated with a binder having a refractive index different from the refractive index of the discrete particles, such that the scattering of incident near infrared radiation occurs at the interface between the discrete particles and the binder.

Fine particulates of the natural, manufactured, and recycled materials can be agglomerated to provide cores having an average size suitable for roofing granules. Preferably, the agglomerated cores include near infrared radiation-scattering voids and/or or bound with a binder having a refractive index differing from that of the fine particulates. Various types of stone dust can be employed in the process of the present invention. Stone dust is a natural aggregate produced as a by-product of quarrying, stone crushing, machining operations, and similar operations. In particular, dust from naturally occurring minerals such as calcite, white rock, plagioclase, quartz, zeolite, limestone or marble can be used, as well as manufactured or recycled manufactured materials such as refractory grog, crushed porcelain, alumina; silica, and silica gel, and the like. Preferably, the core-forming mineral particles are manufactured from crushing naturally occurring rocks into suitable sizes. The cores can be prepared by comminuting and screening the material to provide an average size suitable for roofing granules. Preferably, the cores have an average particle size from about 0.1 mm to about 2 mm, preferably about 0.4 mm to about 1.5 mm. Preferably, the cores comprise porous inorganic material having an average pore size selected to effective scatter near infrared radiation. Preferably the cores have an average pore size of from about 100 to 2500 nm. Preferably, the porous inorganic material comprising the cores has an average pore volume of from about 10 to 50 percent. Alternatively, suitable cores can be prepared by comminuting suitable minerals to an average size less than that suitable for use in roofing granules to thus form small particles, and subsequently agglomerating these small particles to form cores. A core binder can be included to provide mechanical strength to the agglomerated particles forming cores. The core binder is preferably selected from the group consisting of silicate, silica, phosphate, titanate, zirconate, and aluminate binders, and mixtures thereof. In one aspect, the core binder preferably further comprises an inorganic material selected from the group consisting of aluminosilicate and kaolin clay. Formation of the agglomerated mineral particles into cores can be accomplished as disclosed in United States Patent Publication 2004/0258835 A1 incorporated herein by reference.

While it is anticipated that a substantial portion of the near infrared reflectivity of the roofing granules of one presently preferred embodiment of the present invention will be provided by the core and the voids in the granule cores, the near infrared reflectivity of the granules can be enhanced by including at least one near infrared-reflective material. For example, at least one near infrared-reflective material can be included in the UV coating.

Alternatively, when formed from agglomerate, the cores can include at least one near infrared-reflective material to provide near infrared reflectivity to the cores, with scatter from interfaces such as those provided by porosity making only a minor contribution to the near infrared reflectivity of the cores.

Examples of near infrared-reflective materials that can be employed include solar-reflective fillers and pigments such as rutile titanium dioxide and anatase titanium dioxide, aluminum oxide, mullite, zinc oxide, calcium carbonate, metal particles, metal flakes, ceramic particles, refractory grog, crushed porcelain, crushed concrete, reflective polymeric particles, lithopone, zinc sulfide, white lead, metal pigments, titanates, and mirrorized silica pigments.

An example of titanium dioxide that can be employed in the solar reflective roofing granules of the present invention includes R-101 which is available from Du Pont de Nemours, P.O. Box 8070, Wilmington, Del. 19880.

Examples of mirrorized silica pigments that can be employed in the process of the present invention include pigments such as Chrom Brite™ CB4500, available from Bead Brite, 400 Oser Ave, Suite 600, Hauppauge, N.Y. 11788.

Examples of metal pigments that can be employed in the roofing granules of the present invention include aluminum flake pigment, copper flake pigments, copper alloy flake pigments, and the like. Metal pigments are available, for example, from ECKART America Corporation, Painesville, Ohio 44077. Suitable aluminum flake pigments include water-dispersible lamellar aluminum powders such as Eckart RO-100, RO-200, RO-300, RO-400, RO-500 and RO-600, non-leafing silica coated aluminum flake powders such as Eckart STANDART PCR-212, PCR 214, PCR 501, PCR 801, and PCR 901, and STANDART Resist 211, STANDART Resist 212, STANDART Resist 214, STANDART Resist 501 and STANDART Resist 80; silica-coated oxidation-resistant gold bronze pigments based on copper or copper-zinc alloys such as Eckart DOROLAN 08/0 Pale Gold, DOROLAN 08/0 Rich Gold and DOROLAN 10/0 Copper.

Examples of titanates that can be employed in the near infrared-reflective roofing granules of the present invention include titanate pigments such as colored rutile, priderite, and pseudobrookite structured pigments, including titanate pigments comprising a solid solution of a dopant phase in a rutile lattice such as nickel titanium yellow, chromium titanium buff, and manganese titanium brown pigments, priderite pigments such as barium nickel titanium pigment; and pseudobrookite pigments such as iron titanium brown, and iron aluminum brown. The preparation and properties of titanate pigments are discussed in Hugh M. Smith, *High Performance Pigments*, Wiley-VCH, pp. 53-74 (2002).

Examples of near infrared-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium).

Aluminum oxide, preferably in powdered form, can be used as near infrared-reflective additive to improve the solar reflectance of the roofing granules. The aluminum oxide should have particle size less than #40 mesh (425 micrometers), preferably between 0.1 micrometers and 5 micrometers. More preferably, the particle size is between 0.3 micrometers and 2 micrometers. The alumina should have a percentage of aluminum oxide greater than 90 percent, more preferably greater than 95 percent. Preferably the alumina is incorporated into the granule so that it is concentrated near and/or at the outer surface of the granule.

The near infrared-reflective roofing granules of the present invention can also include light-interference platelet pigments. Light-interference platelet pigments are known to give rise to various optical effects when incorporated in coatings, including opalescence or "pearlescence."

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon $Al_2O_3$ platelets coated with metal oxides, including Xirallic T 60-10 WNT crystal silver, Xirallic T 60-20 WNT sunbeam gold, and Xirallic F 60-50 WNT fireside copper; Color Stream™ multi color effect pigments based on $SiO_2$ platelets coated with metal oxides, including ColorStream F 20-00 WNT autumn mystery and ColorStream F 20-07 WNT viola fantasy; and ultra interference pigments based on titanium dioxide and mica.

A colored, near infrared-reflective pigment can also be employed in preparing the near infrared-reflective roofing granules of the present invention. Preferably, the colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near-infrared non-absorbing colorant. Near-infrared non-absorbing colorants that can be used in the present invention are organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups. When organic colorants are employed, a low temperature cure process is preferred to avoid thermal degradation of the organic colorants.

The amount of near infrared-reflective particles added is preferably such that the resulting near infrared-reflective roofing granules have a near infrared reflectance of at least about 60 percent, and preferably at least about 70 percent.

In addition to the effective UV resistance and near infrared reflectance, the roofing granules of the present invention can include at least one colorant, preferably a color pigment, to provide a desired appearance in the visible range. Preferably, the at least one color pigment is dispersed in the UV coating layer.

Preferably, the at least one color pigment has an average transmission of at least sixty percent in the near infrared range of the electromagnetic spectrum. Preferably, the at least one color pigment has an average ultraviolet transmission of less than ten percent.

In addition, or in the alternative, the at least one colorant, such as one or more conventional metal oxide-type granule coloring pigments, can be dispersed in a suitable binder to form a color coating composition to form a color coating layer. A color coating can be applied over the UV coating layer or under the UV coating layer. When a near infrared-reflective material is employed, the at least one colorant can be included with near infrared-reflective material in the UV coating, or in a separate coating layer over or under the UV coating. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Further examples of coatings pigments that can be used include white titanium dioxide pigments provided by Du Pont de Nemours, P.O. Box 8070, Wilmington, Del. 19880.

In another aspect of the present invention, the cores are coated with at least one thin metal layer. Preferably, the thickness of the coating formed by the at least one metal layer is selected to maximize near infrared reflectivity consistent with achieving the desired color tone for the roofing granule. The deposition of thin metal films by a variety of techniques is well known in the art. Preferably, each of the layers of thin film is applied by an application process selected from the group consisting of atmospheric plasma deposition, plasma-assisted polymerization, chemical vapor deposition, physical vapor deposition, sputtering, casting, coating, laminating, electroplating, electroless plating, and thermal spraying. Preferably, the application process is selected from the group consisting of atmospheric plasma deposition, plasma-assisted polymerization, and physical vapor deposition. Preferably, each of the layers of the thin film comprises a material selected from the group consisting of silver, aluminum, copper, zinc, tin, gold, palladium, nickel, and alloys thereof. Each of the layers of thin film can comprise an alloy of silver and copper, an alloy of gold and palladium, etc.

In one aspect, roofing granules of the present invention further include at least one biocide. The UV coating layer can include the at least one biocide. Further, the roofing granules of the present invention can further include an additional coating layer, the additional coating layer including the at least one biocide. Suitable biocides are disclosed, for example, in U.S. Patent Publications 2004/0255548 A1, 2004/0258835 A1, 2007/0148340 A1, 2007/0148342 A1, and 2008/01186640 A1, each incorporated herein by reference.

In one aspect of the present embodiment, the UV coating layer has an average transmission in the visible range of greater than sixty percent.

The UV coating layer can comprise a coating binder and, optionally, at least one material dispersed in the coating binder. The ultraviolet opacity of the UV coating layer can be provided by the coating binder, the at least one material dispersed in the coating binder, or by a combination thereof. Preferably, the at least one material is an ultraviolet absorber selected from the group consisting of organic ultraviolet absorbing compounds, organic ultraviolet absorbing particles, and insoluble ultraviolet absorbing pigments.

Preferably, in one aspect the ultraviolet absorbing inorganic pigments comprise micronized titanium dioxide, micronized zinc oxide, and micronized cerium oxide. In another aspect, the insoluble ultraviolet absorbing inorganic particles comprise titanium oxide nanoparticles, zinc oxide nanoparticles, iron oxide nanoparticles, and cerium oxide nanoparticles.

In one aspect, the organic ultraviolet absorbing particles preferably comprise micronized 2,2'-methylenebis[6-(2H-benzotriazol-2-yl)-4-(1,1,3,3-tetramethylbutyl)phenol].

In one aspect, the organic ultraviolet absorbing compound is preferably selected from the class consisting of triazines, benzotriazoles, benzophenones, vinyl-group containing amides, cinnamic acid amides, and sulfonated benzimidazoles.

In another aspect, the at least one organic ultraviolet absorbing compound comprises at least one ultraviolet A absorber and at least one ultraviolet B absorber. Preferably, the at least one ultraviolet A absorber is selected from the group consisting of butyl methoxydibenzoylmethane, 5-methyl-2-(1-methylethyl)cyclohexanol-2-aminobenzoate, bis[7,7-dimethyl-oxo-]terephthalylidene dicamphor sulfonic acid, methylene bis-benzotriazolyl tetramethylbutylphenol, Preferably, the at least one ultraviolet B absorber is selected from the group consisting of octyl methoxycinnamate, 2-benzoyl-5-methoxyphenol, ethylhexyl salicylate, 2-cyano-3,3-diphenyl acrylic acid, 3,3,5-trimethylcyclohexanol salicylate, phenylbenzimazole sulfonic acid, 2-ethylhexyl-4-dimethylamino benzoate, 2-hydroxy-4-methoxybenzophenone-5-sulfonic acid, p-aminobenozic acid.

Binders employed in the compositions of the present invention, such as binders for UV coating compositions forming the UV coating layer, and binders employed to form cores from agglomerated particulates, can include a binder preferably selected from the group consisting of metal silicate, phosphate, silica, acrylate, polyurethane, silicone, fluoropolymer and polysilazane. Examples of suitable phosphate binders are disclosed, for example, in International Application PCT/US08/64674, incorporated herein by reference. The UV coating compositions and/or the core binder composition employed in the present invention can be liquid polymeric compositions such as solutions in which a suitable polymeric binder is dissolved in an organic solvent, or aqueous polymer compositions such as aqueous dispersions of a suitable polymeric binder. Alternatively, powder coating compositions, such as a powder coating composition including a suitable polymeric binder in solid form, can be employed. Whatever the physical form of the polymeric coating composition, the polymeric binder is preferably selected to provide good UV resistance to the roofing granules of the present invention. Thus, polymeric binders with good UV resistance, such as poly(meth)acrylate binders, are preferred. Alternatively, the binder can be a silicate-type binder such as can be employed to prepare the agglomerated cores of the present invention.

The UV coating composition and the core binder compositions can also include other components, such as colorants, biocides, curing agents, viscosity modifiers, adhesion promoters, coalescing agents, film forming agents, solvents, catalysts, extenders, and fillers.

The near infrared-reflective roofing granules of the present invention can include conventional coatings pigments such that the coated granules not only have high UV opacity, but also have aesthetically pleasing colors. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Such conventional coatings pigments can be included in the UV coating composition, or in a separate inner coating layer formed over the mineral particles forming the cores and under the outer UV coating layer. Preferably, the conventional color pigment chosen also provides relatively high level of transparency in the near infrared portion of the electromagnetic spectrum, such that the solar heat can be preferentially reflected by the highly reflective substrate particle. Examples of such coloring pigments are disclosed, for example, in U.S. Pat. No. 7,241,500, incorporated herein by reference. Furthermore, the color pigments employed preferably have high UV opacity, such that the use of UV absorber in the UV coating can be reduced.

The present invention also provides a process for preparing near infrared-reflective roofing granules. The process includes providing cores preferably having an average ultraviolet transmission of greater than sixty percent and an average solar reflectance of greater than sixty percent. In one presently preferred embodiment of the present invention, a UV coating composition is applied on the exterior surface of the cores. In another embodiment of the process of the present invention, an inner coating layer is applied over the cores, and the UV coating composition is applied to the inner coating layer to form the UV coating layer. In one aspect, the inner coating layer provides near infrared reflectivity supplementing the infrared reflectivity provided by the near infrared-reflective core. Such near infrared-reflective coating layers can be formed from one or more metal films. Alternatively, such near infrared-reflective coating layers can be formed by including one or more near infrared-reflective materials in a suitable binder to form a near infrared-reflective coating composition. The near infrared-reflective coating composition can be applied to particles or grains of suitable infrared-reflective minerals, and subsequently cured to provide cores. In one aspect, the process further includes agglomerating ultraviolet transparent base particles to form cores or grains.

In one aspect, the process of the present invention comprises providing a binder and inert mineral particles; dispersing the inert mineral particles in the binder to form a mixture; optionally adding processing aids and/or other additives to the mixture; forming the mixture into uncured or "green" cores or grains; and curing the binder. The cores can be formed by the methods disclosed in United States Patent Publication 2004/0258835 A1. The "green" or uncured cores can be formed by using relatively low-cost raw materials, such as UV transparent stone dust, and adding water and/or a suitable binder followed by a suitable granulation or agglomeration process to form the uncured cores. These raw materials can be mixed to form a mixture with suitable consistency, and then formed into particles with suitable granule size ranging from mesh #40 to mesh #8 through proper granulation process or by cement casting. After forming the granule core, the cores can be cured either through heat treatment or chemical reaction to produce granules with enough crushing strength that is needed for the manufacturing of asphalt shingles. In another aspect, the process also includes providing ultraviolet transparent mineral particle grains, and applying a color coating to the grains to form cores.

In particular, the core binder can be a binder selected from the group consisting of clay, cement, alkali metal silicates such as sodium silicate and potassium silicate, silicate, silica, phosphate, titanate, zirconate, and aluminate binders, and mixtures thereof. The binder can further comprise an inorganic material selected from the group consisting of aluminosilicate and kaolin clay. In one aspect of the present invention, the binder is a soluble alkali metal silicate, such as aqueous sodium silicate or aqueous potassium silicate. The soluble alkali metal silicate is subsequently insolubilized by heat or by chemical reaction, such as by reaction between an acidic material and the alkali metal silicate, resulting in cured solar reflective granules. The binder may also include additives for long term outdoor durability and functionality.

When an alkali metal-silicate binder such as sodium silicate is employed in the preparation of solar reflective cores, the binder can include a heat-reactive aluminosilicate material, such as clay, for example, kaolin clay. Alternatively, it is possible to insolubilize the metal silicate binder chemically by reaction with an acidic material, for example, ammonium chloride, aluminum chloride, hydrochloric acid, calcium chloride, aluminum sulfate, and magnesium chloride, such as disclosed in U.S. Pat. Nos. 2,591,149, 2,614,051, 2,898,232 and 2,981,636, or other acidic material such as aluminum fluoride. The binder can also be a controlled release sparingly water soluble glass such as a phosphorous pentoxide glass modified with calcium fluoride, such as disclosed in U.S. Pat. No. 6,143,318. The most commonly used binder for conventional granule coating is a mixture of an alkali metal silicate and an alumino-silicate clay material.

Examples of clays that can be employed in the process of the present invention include kaolin, other aluminosilicate clays, Dover clay, bentonite clay, etc.

The mixture of mineral particles, solar reflective particles and binder can be formed into uncured solar reflective cores, using a forming process such as press, molding, cast molding, injection molding, extrusion, spray granulation, gel casting, pelletizing, compaction, or agglomeration. Preferably, the resulting uncured solar reflective cores have sizes between about 50 micrometer and 5 mm, more preferably between about 0.1 mm and 3 mm, and still more preferably between about 0.5 mm and 1.5 mm. The uncured solar reflective roofing cores can be formed using a conventional extrusion apparatus. For example, aqueous sodium silicate, kaolin clay, mineral particles, and solar reflective particles and water (to adjust mixability) can be charged to a hopper and mixed by a suitable impeller before being fed to an extrusion screw provided in the barrel of the extrusion apparatus, such as disclosed, for example, in United States Patent Publication 2004/0258835 A1. Alternatively, the ingredients can be charged to the extruder continuously by gravimetric feeds. The screw forces the mixture through a plurality of apertures having a predetermined dimension suitable for sizing roofing granules. As the mixture is extruded, the extrudate is chopped by suitable rotating knives into a plurality of uncured solar reflective cores, which are subsequently fired at an elevated temperature to sinter or densify the binder. When the formed cores are fired, such as in a rotary kiln, at an elevated temperature, such as at least 800 degrees C., and preferably at 1,000 to 1,200 degrees C., and the binder densifies to form solid, durable, and crush-resistant cores for the granules. In another aspect of the present invention, near infrared-reflective cores are produced by an accretion process such as disclosed in U.S. Pat. No. 7,067,445, incorporated herein by reference.

Thus, in one aspect the present invention provides roofing granules comprising a core comprising an agglomerate comprising base particles and an agglomerate binder. In this aspect, the base particles preferably have an average ultraviolet transmission of greater than about 60 percent and an average near infrared reflectance of greater than about 60 percent, and the agglomerate binder preferably has an average ultraviolet transmission of less than 10 percent. In this aspect, the agglomerate binder preferably has an average transmission in the near infrared and visible ranges of the electromagnetic spectrum of greater than about 60 percent.

In one aspect of the present invention, the exterior surface of the cores is coated with a UV coating composition to provide a UV coating layer having high opacity to ultraviolet radiation and high transmittance for near infrared radiation. Preferably, the UV coating layer formed from the UV coating composition has an average ultraviolet transmission of less than ten percent and an average near infrared transmission of greater than sixty percent. Preferably, the UV coating is applied uniformly to encapsulate the surface of the exterior surface of the cores, such as by a fluidized bed technique, such as disclosed in U.S. Patent Publication 2006/0251807 A1, incorporated herein by reference, in order to ensure that the entire surface of the cores is coated. When coating granules using conventional methods, even with multiple conventional coats, typically only about 70% surface coverage can be achieved. Fluidized bed coating is able to achieve a uniform and complete coverage of irregular surfaces, completely encapsulating the core particles with greater than 95% surface coverage. Through use of a fluidized bed encapsulation process to coat the core particles, the UV coating composition, preferably including but not limited to pigments, binders, and UV blockers or absorbers, completely covers the entire surface of the core particles thus achieving UV opacity, without the need for initial coats of UV blockers or UV absorbers or multiple color coats.

In another aspect of the present invention the core binder composition employed provides UV reflectance or opacity to the cores. In this aspect of the present invention, the inert mineral particles which are agglomerated to form the cores have high UV transparency, and the UV binder composition provides UV reflectance or UV opacity to the cores. The UV binder composition preferably includes suitable pigments, binders, and UV blockers or absorbers. Provided that the binder has sufficient UV reflectance or UV opacity so that a predetermined level of UV opacity is achieved, a UV coating composition need not be used to coat the surface of the core particles, or the thickness of the UV coating layer can be reduced, and/or the concentration of UV opaque component(s) of the UV coating layer can be reduced.

When used to prepare bituminous roofing products such as asphalt shingles, roofing granules according to the present invention thus reflect solar heat by virtue of the near infrared-reflective inert mineral particles while blocking ultraviolet radiation to protect the underlying asphalt substrate in which they are embedded. Preferably, the roofing granules have an average particle size from about 0.1 mm to 3 mm, and more preferably from about 0.5 mm to 1.5 mm.

The resultant granules can also be surface treated with siliconates or suitable oils to enhance their adhesion to asphalt and also to reduce their staining potentials.

Referring now to the drawings, in which like reference numerals refer to like elements in each of the several views, there are shown schematically in FIGS. 4, 5, 6, 7 and 8 examples of near infrared-reflective roofing granules according to the present invention.

Figure 4:
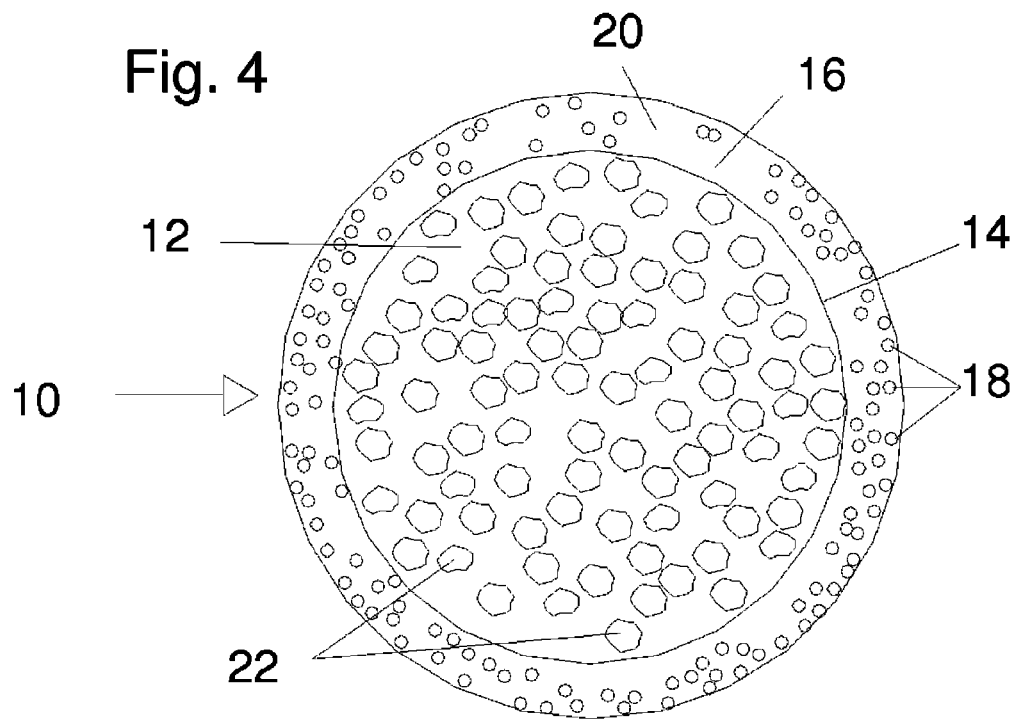
FIG. 4 is a schematic sectional elevational representation of a roofing granule according to a first embodiment of the present invention.

FIG. 4 is a schematic cross-sectional representation of a first embodiment of near infrared-reflective roofing granule 10 according to the present invention. The near infrared-reflective roofing granule 10 comprises a near infrared-reflective inert mineral core particle 12 coated with a UV coating layer 16 comprising UV absorptive particles 18 dispersed in a UV absorptive binder 20. The presence of UV absorptive particles 18 can be optional provided that the UV absorptive binder 20 can provide enough UV opacity. The core particles 12 have an exterior surface 14. A UV coating composition is applied to completely cover the exterior surface 14 of the core particles 12; and the UV coating composition is cured to form the UV coating layer. Near infrared reflectance is provided to the roofing granule 10 by virtue of the near infrared-reflective core particles 12 by virtue of the core or a plurality of voids 22 within the core particles 12. The voids 22 are naturally occurring defects in the mineral material comprising the core particles 12. The voids 22 have average dimensions on the order of the wavelength of near infrared radiation, and thus scatter incident radiation at near infrared wavelengths, by virtue of the difference in refractive index between the voids 22 and the core particle material. While the near infrared-reflective roofing granule 10 is shown schematically as a sphere in FIG. 4, near infrared-reflective roofing granules according to the present invention can assume any regular or irregular shape. The particle size of the near infrared-reflective roofing granule 10 preferably ranges from about 0.1 mm to 3 mm, and more preferably from about 0.5 mm to 1.5 mm.

Figure 5:
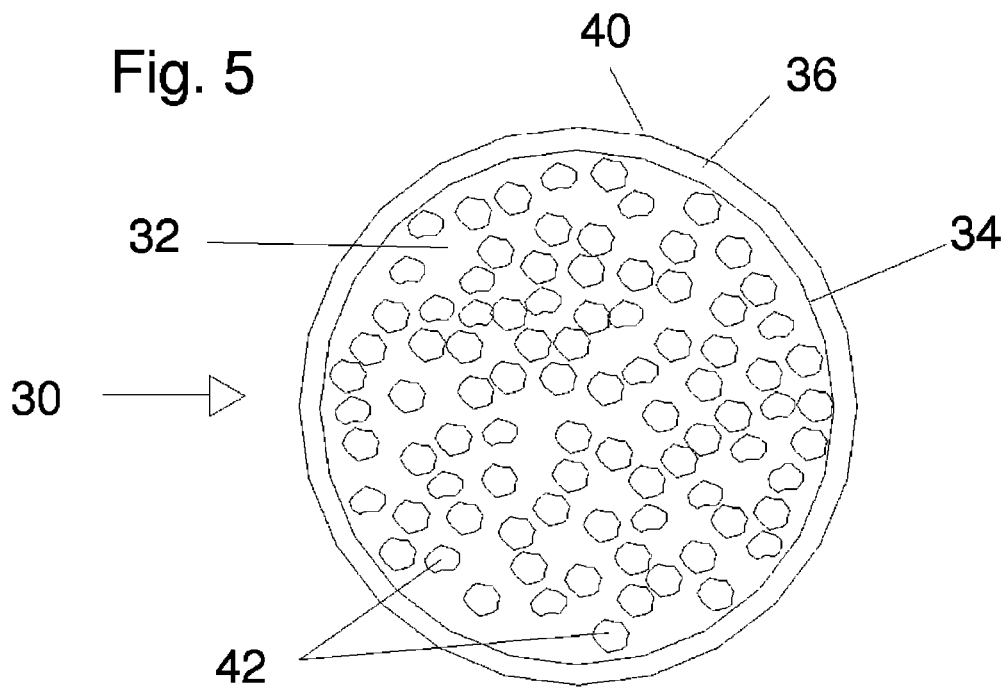
FIG. 5 is a schematic sectional elevational representation of a roofing granule according to a second embodiment of the present invention.

FIG. 5 is a schematic cross-sectional representation of a second embodiment of near infrared-reflective roofing granules 30 according to the present invention. The near infrared-reflective roofing granules 30 comprise a near infrared-reflective inert mineral core particle 32 coated with a UV coating layer 36 comprising a UV absorptive binder 40. The core particles 32 have an exterior surface 34. A UV coating composition is applied to completely cover the exterior surface 34 of the core particles 32; and the UV coating composition is cured to form the UV coating layer. Near infrared reflectance is provided to the roofing granule 30 by virtue of the near infrared-reflective core particles 32 by virtue of the core or a plurality of voids 42 within the core particles 32. The voids 42 are naturally occurring defects in the mineral material comprising the core particles 32. The voids 42 have average dimensions on the order of the wavelength of near infrared radiation, and thus scatter incident radiation at near infrared wavelengths, by virtue of the difference in refractive index between the voids 42 and the core particle material.

FIG. 6 is a schematic cross-sectional representation of a third embodiment of near infrared-reflective roofing granule 50 according to the present invention. The near infrared-reflective roofing granule 50 comprises a near infrared-reflective inert mineral core particle 52 coated with a UV coating layer 56 comprising a UV absorptive inorganic pigment such as titanium dioxide nanoparticles 58 dispersed in a suitable binder 60. The inert mineral core particle 52 has an exterior surface 54 to which a UV opaque coating composition is applied and cured to form the UV coating layer. The core particles 52 are formed from a plurality of agglomerated mineral particles 70 adhered together with a suitable binder material 72 and have a plurality of pores or voids 74 extending throughout the core particles 52. The binder material 72 is preferably selected from the group consisting of silicate, silica, phosphate, titanate, zirconate and aluminate binders, and mixtures thereof. The binder content of the core particles 52 preferably ranges from 10% to 90% by weight. The core particles 52 can be formed by extrusion, agglomeration, roll compaction, accretion, or other forming techniques. After formation, depending on binder chemistry, the core particles 52 can be fired at 250 degrees C. or higher, preferably from 500 degrees C. to 800 degrees C., to insolubilize the binder material 72. Near infrared reflectance is provided to the roofing granules 50 by virtue of the near infrared-reflective core particles 52 by virtue of the plurality of voids 74 within the core particles 52. The voids 74 have average dimensions on the order of the wavelength of near infrared radiation, and thus scatter incident radiation at near infrared wavelengths.

FIG. 7 is a schematic cross-sectional representation of a fourth embodiment of near infrared-reflective roofing granule 80 according to the present invention. The near infrared-reflective roofing granule 80 comprises a near infrared-reflective inert mineral core particles 82 coated with a UV coating layer 86 comprising and UV absorptive particles 88 such as nano zinc oxide dispersed in a UV absorptive binder 90. The core particles 82 each comprise a particle or grain 100 of an inert UV transparent mineral, such as calcite, white rock, plagioclase, quartz, zeolite, limestone, marble, refractory grog, crushed porcelain, alumina, porous silica or silica gel, coated with a near infrared-reflective layer 104 of a thin metal film. The inert mineral grains 100 themselves include voids 102 effective to scatter incident near infrared radiation, and the near infrared-reflective layer 104 supplements the effect of the voids 102 with respect to incident near infrared radiation. The near infrared-reflective film 104 is formed on the grains 100 by a metal sputtering technique.

Figure 8:
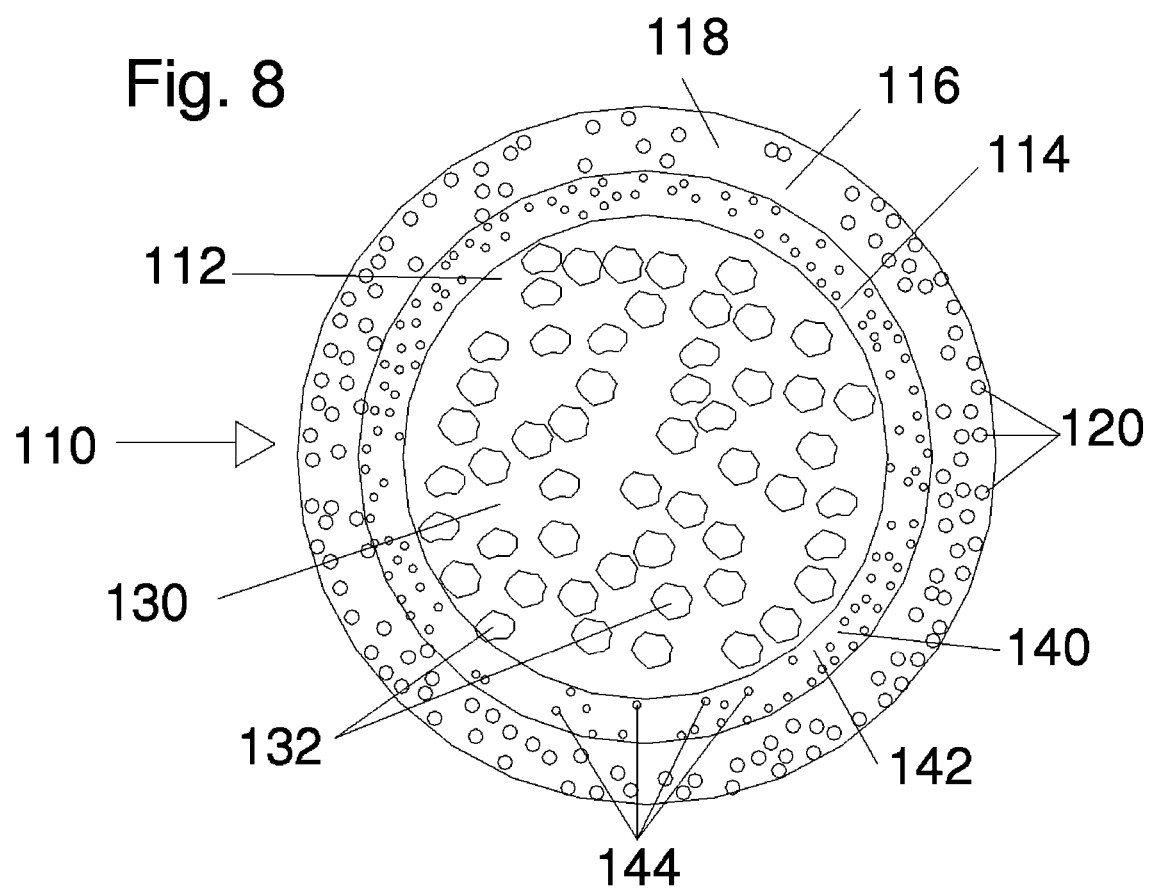
FIG. 8 is a schematic sectional elevational representation of a roofing granule according to a fifth embodiment of the present invention.

FIG. 8 is a schematic cross-sectional representation of a fifth embodiment of near infrared-reflective roofing granules 110 according to the present invention. The near infrared-reflective roofing granule 110 comprises a near infrared-reflective inert mineral core particles 112 coated with a UV coating layer 116 comprising and UV absorptive binder 118 in which are dispersed metal oxide pigment particles 120 to impart a desired color to the roofing granules 100. The near infrared-reflective core particle 112 has an exterior surface 114 to which a UV coating composition is applied and cured to form the UV coating layer 116. The near infrared-reflective core particle 112 comprises a inner inert mineral grain or particle 130 and an inner coating layer 140 comprising a inner coating binder 142 in which are dispersed additional near infrared-reflective particles 144. Near infrared reflectance is provided to the roofing granule 110 by virtue of the near infrared-reflective grain 130 by virtue of a plurality of voids 132 within the grain 130. The voids 132 are naturally occurring defects in the mineral material comprising the grain 130.

The voids 132 have average dimensions on the order of the wavelengths of near infrared radiation, and thus scatter incident radiation at near infrared wavelengths. The grains 130 are minute particulates or dust, such as for example, particulates of calcite, white rock, plagioclase, quartz, zeolite, limestone, marble, refractory grog, crushed porcelain, alumina, porous silica, silica gel or other UV transparent rock sources formed as a byproduct from quarry, crushing and similar operations. The near infrared reflectance of the grain 130 is supplemented by the near infrared-reflectance of the inner coating layer 140 by virtue of the additional near infrared-reflective particles 144.

The near infrared-reflective roofing granules of the present invention can be employed in the manufacture of roofing products, such as asphalt shingles and bituminous membranes, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The near infrared-reflective roofing granules of the present invention can be mixed with conventional roofing granules, and the granule mixture can be embedded in the surface of such bituminous roofing products using conventional methods. Alternatively, the near infrared-reflective roofing granules of the present invention can be substituted for conventional roofing granules in manufacture of bituminous roofing products.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Alternatively, the reverse side of the substrate sheet can be coated with an adhesive material, such as a layer of a suitable bituminous material, to render the sheet self-adhering. In this case the adhesive layer is preferably covered with a suitable release sheet.

Roofing granules are then distributed over selected portions of the top of the sheet, and the bituminous material serves as an adhesive to bind the roofing granules to the sheet when the bituminous material has cooled.

Optionally, the sheet can then be cut into conventional shingle sizes and shapes (such as one foot by three feet rectangles), slots can be cut in the shingles to provide a plurality of "tabs" for ease of installation, additional bituminous adhesive can be applied in strategic locations and covered with release paper to provide for securing successive courses of shingles during roof installation and/or aesthetic effect, and the finished shingles can be packaged. More complex methods of shingle construction can also be employed, such as building up multiple layers of sheet in selected portions of the shingle to provide an enhanced visual appearance, or to simulate other types of roofing products.

In addition, the roofing membrane can be formed into roll goods for commercial or industrial roofing applications.

Examples of suitable bituminous membranes for use in the process of the present invention include asphalt roofing membranes such as asphalt-based, self-adhering roofing base sheet available from CertainTeed Corporation, Valley Forge, Pa., for example, WinterGuard™ shingle underlayment, a base sheet which is impregnated with rubberized asphalt.

Preferably, the reinforcement material comprises a non-woven web of fibers. Preferably, the nonwoven web comprises fibers selected from the group of glass fibers, polymeric fibers and combinations thereof. Examples of suitable reinforcement material include, but are not limited to, non-woven glass fiber mats, non-woven polyester mats, composite non-woven mats of various fibers, composite woven fabrics of various fibers, industrial fabrics such as papermaker's forming fabrics and papermaker's canvasses, polymer netting, screen, and mineral particles. The fibers employed in preparing the reinforcing material can be spun, blown or formed by other processes known in the art. Yarn for forming the reinforcement material can include mono-filament yarn, multi-filament yarn, spun yarn, processed yarn, textured yarn, bulked yarn, stretched yarn, crimped yarn, chenille yarn, and combinations thereof. The cross-section of the yarn employed can be circular, oval, rectangular, square, or star-shaped. The yarn can be solid, or hollow. The yarn can be formed from natural fibers such as wool and cotton; synthetic materials such as polyester, nylon, polypropylene, polyvinylidene fluoride, ethylene tetrafluoroethylene copolymer, polyethylene terephthalate, polybutylene terephthalate, polytrimethylene terephthalate, poly(meth)acrylates, aramide, polyetherketone, polyethylene naphthalate, and the like, as well as non-organic materials such as spun glass fibers and metallic materials, or combinations thereof.

Non-woven glass fiber mats for use in the process of the present invention preferably have a weight per unit area of from about 40 to 150 $g/m^2$, more preferably form about 70 to 120 $g/m^2$, and still more preferably from about 80 to 100 $g/m^2$, and a thickness of from about 0.01 to 1 mm. Non-woven glass mats having a weight per unit area of about 90 $g/m^2$ (0.018 $lb/ft^2$) are typically employed. The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

COMPARATIVE EXAMPLE 1

Aluminum oxides known as ceramic grog (grade 90A commercially available from Maryland Refractory Inc., Irondale, Ohio) are used as core particles. The core particles have particle sizes between US #12 mesh and US #40 mesh and an initial color of $L^*=85.82$, $a^*=-0.18$, $b^*=3.66$ as measured by colorimeter (HunterLab Labscan XE) and a solar reflectance of 69.0% as measured according to ASTM C-1549 procedure. The core particles have relatively low UV opacity of <5% as determined by the UV Opacity test listed in ARMA Granule Test Manual as Test Method #9, except that the test results were digitized by a CCD camera instead of recording on a photo paper. The UV test results are shown in FIG. 1. The presence of a spot indicates UV transparency of the granule. Due to the high UV transparency of this type of material, the material is deemed as not suitable for roofing applications.

Example 1

Figure 2:
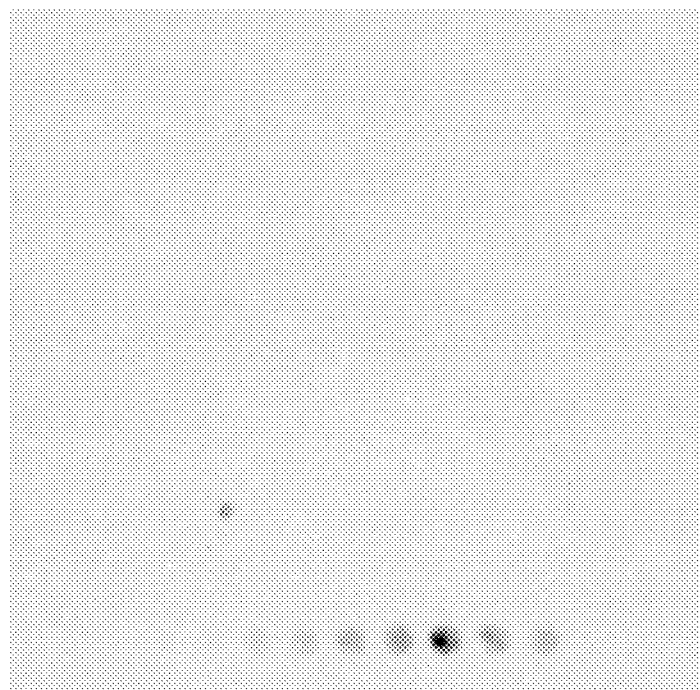
FIG. 2 is a reproduction of the results of a UV opacity test for a sample of roofing granules prepared according to the present invention.

The base particles of Comparative Example 1 were coated by a coating containing nano zinc oxide and titanium dioxide as a UV blocker to render them UV opaque. This was achieved by coating 500 g of the core particles with a coating consisting of 32.40 g sodium silicate (grade 42 from Oxychem Corp., Dallas, Tex.). 50.40 g of water, 7.20 g of kaolin clay (Unimin Corp. Hephzibah, Ga.), 10.80 g of zinc oxide (Kadox 920 from Zinc Corp of America), and 6.10 g of titanium dioxide (R101 from DuPont Corp., Wilmington, Del.). The coating was prepared by mixing the ingredients in a mixer at 300 rpm until a uniform mixture and the base particles were then coated by the coating by using a fluidized bed coater (model 0002 from Fluid Air Inc., Aurora, Ill.). The resultant particles have a color reading of $L^*=76.34$, $a^*=1.11$, $b^*=5.18$, and a solar reflectance of 57.1%. The UV opacity test shows that the resultant particles have much higher UV opacity at >98% as determined by the same test method. The result is shown in FIG. 2.

COMPARATIVE EXAMPLE 2

Figure 3:
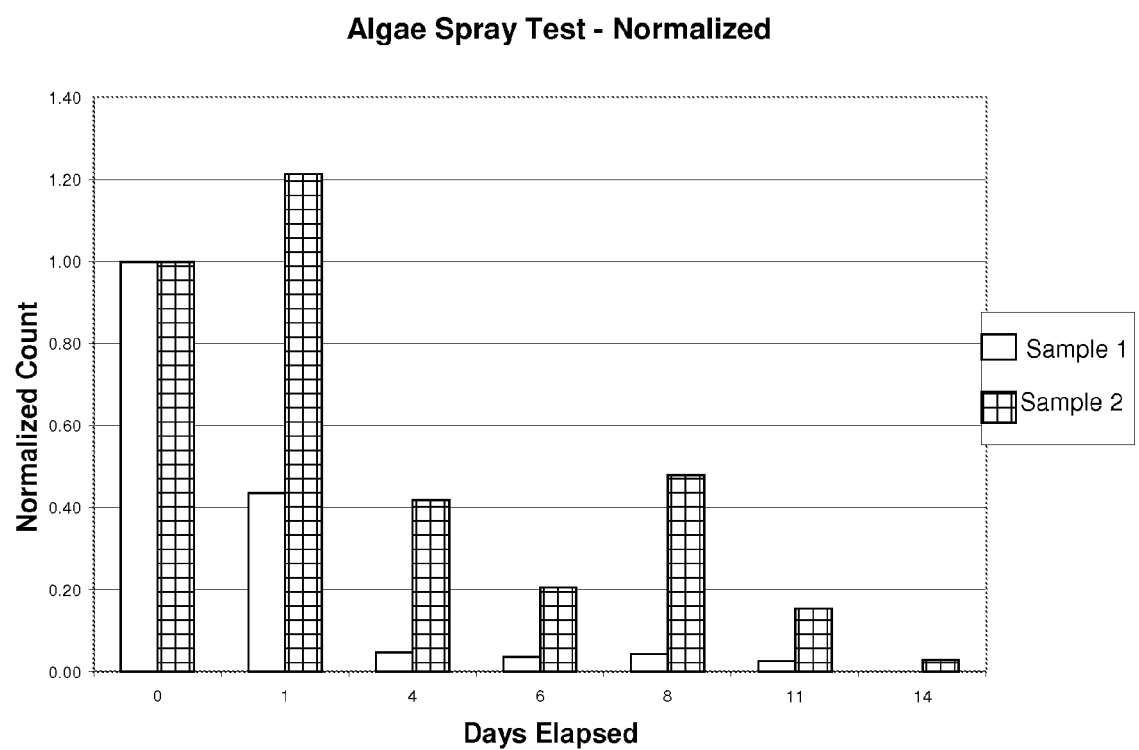
FIG. 3 is chart illustrating the results of an algae spray test for a second sample of roofing granules prepared according to the present invention.

600 grams of grey roofing granules were prepared by coating mineral particles having sizes between US mesh #10 and US mesh #4 with a grey coating composition composed of 125 g. sodium silicate, 21.77 grams IR transparent and IR opaque pigments, which are as follows: 4.85 grams Sheppard 411 Black, 8.64 grams Ferro RD-1563, 0.60 grams Ferro Acid Resistant Ultramarine Blue, 4.68 grams DuPont R101 $TiO_2$, 3.84 grams Ferro 10550 Brown, and 1.44 grams Ferro V-10411 Yellow, 18.50 grams zinc oxide (Kadox 920 from Zinc Corp of America), 9.55 grams Wilky clay (available from Wilkinson Kaolin Associates, Ltd., Gordon, Ga.), and 45 grams water. The coating was deposited on the mineral particles using a Wurster fluidized bed coater. The grey coated granules were then cured in a rotary dryer at 565° C. (1050° F.). Finished granules were then applied to two panels of filled asphalt coating where a spray algae test was conducted for 14 days. These roofing granules exhibited algae resistance. As shown in FIG. 3, after 14 days both panels of grey roofing granules had little or no algae remaining on the panel.

Example 2

600 grams of grey roofing granules can be prepared by coating ceramic grog 90A (a UV transparent mineral material) supplied by Maryland Refractories with a grey coating composition composed of 125 g. sodium silicate, 21.77 grams IR transparent and IR opaque pigments, which are as follows: 4.85 grams Sheppard 411 Black, 8.64 grams Ferro RD-1563, 0.60 grams Ferro Acid Resistant Ultramarine Blue, 4.68 grams DuPont R101 $TiO_2$, 3.84 grams Ferro 10550 Brown, and 1.44 grams Ferro V-10411 Yellow, 18.50 grams zinc oxide (Kadox 920 from Zinc Corp of America), 9.55 grams Wilky clay (available from Wilkinson Kaolin Associates, Ltd., Gordon, Ga.), and 45 grams water. The coating can be deposited on the mineral particles using a Wurster fluidized bed coater. The grey coated granules can then be cured in a rotary dryer at 565° C. (1050° F.). Due to the opaque nature of the coating, the coated UV transparent ceramic grog mineral particle would become granules opaque to UV. Further, due to the presence of zinc oxide, the resulting granules would also be algae resistant. The algae resistance is expected to by similar to the algae resistance of the granules of Comparative Example 2 because the coating provides the algae resistance, and not the core of the granule, assuming the UV transparent ceramic grog core is entirely encapsulated.

Various modifications can be made in the details of the various embodiments of the processes, compositions and articles of the present invention, all within the scope and spirit of the invention and defined by the appended claims.

The invention claimed is:

1. Roofing granules comprising:
    (a) a core having an average ultraviolet transmission of greater than sixty percent and an average near infrared reflectance of greater than sixty percent, the core having an exterior surface, and
    (b) a UV coating layer to cover the exterior surface, the UV coating layer having an average ultraviolet transmission of less than ten percent and an average transmission in the near infrared and visible ranges of the electromagnetic spectrum of greater than sixty percent.

2. Roofing granules according to claim 1 wherein the UV coating layer comprises a binder and at least one material dispersed in the binder.

3. Roofing granules according to claim 2 wherein the binder has an average ultraviolet transmission of less than ten percent.

4. Roofing granules according to claim 2 wherein the at least one material comprises an ultraviolet absorber selected from the group consisting of organic or inorganic ultraviolet absorbing compounds, organic or inorganic ultraviolet absorbing particles, and insoluble ultraviolet absorbing inorganic pigments.

5. Roofing granules according to claim 4 wherein the insoluble ultraviolet absorbing inorganic pigments comprise micronized titanium dioxide, micronized zinc oxide, micronized iron oxide, and micronized cerium oxide.

6. Roofing granules according to claim 4 wherein the insoluble ultraviolet absorbing inorganic particles comprise titanium oxide nanoparticles, zinc oxide nanoparticles, iron oxide nanoparticles and cerium oxide nanoparticles.

7. Roofing granules according to claim 4 wherein the organic ultraviolet absorbing particles comprise micronized 2,2'-methylenebis[6-(2H-benzotriazol-2-yl)-4-(1,1,3,3-tetramethylbutyl)phenol].

8. Roofing granules according to claim 4 wherein the organic ultraviolet absorbing compound is selected from the class consisting of triazines, benzotriazoles, benzophenones, vinyl-group containing amides, cinnamic acid amides, diphenyl acrylates, and sulfonated benzimidazoles.

9. Roofing granules according to claim 4 wherein the organic ultraviolet absorbing compound comprises at least one ultraviolet A absorber and at least one ultraviolet B absorber.

10. Roofing granules according to claim 9 wherein the at least one ultraviolet A absorber is selected from the group consisting of butyl methoxydibenzoylmethane, 5-methyl-2-(1-methylethyl)cyclohexanol-2-aminobenzoate, bis[7,7- dimethyl-oxo-]terephthalylidene dicamphor sulfonic acid, methylene bis-benzotriazolyl tetramethylbutylphenol.

11. Roofing granules according to claim 9 wherein the at least one ultraviolet B absorber is selected from the group consisting of octyl methoxycinnamate, 2-benzoyl-5-methoxyphenol, ethylhexyl salicylate, 2-cyano-3,3-diphenyl acrylic acid, 3,3,5-trimethylcyclohexanol salicylate, phenylbenzimazole sulfonic acid, 2-ethylhexyl-4-dimethylamino benzoate, 2-hydroxy-4-methoxybenzophenone-5-sulfonic acid, p-aminobenozic acid.

12. Roofing granules according to claim 2, the binder being selected from the group consisting of metal silicate, phosphate, silica, acrylate, polyurethane, silicone, fluoropolymer and polysilazane.

13. Roofing granules according to claim 1 wherein the UV coating layer further comprises at least one color pigment.

14. Roofing granules according to claim 13 wherein the at least one color pigment has an average transmission of at least sixty percent in the near infrared range of the electromagnetic spectrum.

15. Roofing granules according to claim 13 wherein the at least one color pigment has an average ultraviolet transmission of less than ten percent.

16. Roofing granules according to claim 1, the UV coating layer further comprising at least one biocide.

17. Roofing granules according to claim 1, the granules further including an additional coating layer, the additional coating layer including at least one biocide.

18. Roofing granules according to claim 1, the granules further including a near infrared-reflective coating layer.

19. Roofing granules according to claim 18, the near infrared coating layer comprising a metal film.

20. Roofing granules according to claim 1, the granules comprising an ultraviolet transparent core formed from at least one material selected from the group consisting of calcite, plagioclase, quartz, zeolite, limestone, marble, refractory grog, crushed porcelain, alumina, porous silica and silica gel.

21. Roofing granules according to claim 20 wherein each core comprises agglomerate.

22. Roofing granules according to claim 21, the agglomerate comprising base particles and an agglomerate binder.

23. Roofing granules according to claim 21, the agglomerate including near infrared radiation-scattering voids.

24. Roofing granules according to claim 21, the agglomerate further comprising at least one additional near infrared-reflective material.

25. Roofing granules according to claim 1 wherein the core comprises porous inorganic material having an average pore size from about 100 to 2500 nm.

26. Roofing granules according to claim 25 wherein the porous inorganic material has an average pore volume of from about 10 to 50 percent.

27. Roofing granules according to claim 1 wherein the UV coating layer covers at least 90 percent of the surface area of the core.

28. Roofing granules according to claim 27 wherein the UV coating layer covers at least 95 percent of the surface area of the core.

29. Roofing granules according to claim 28 wherein the UV coating layer encapsulates the core.

30. Roofing shingles comprising roofing granules according to claim 1.

31. Roll roofing material comprising roofing granules according to claim 1.

32. A process for preparing roofing granules, the process comprising:
(a) providing cores having an average ultraviolet transmission of greater than sixty percent and an average solar reflectance of greater than sixty percent, the core having an exterior surface;
(b) applying a UV coating composition on the exterior surface of the cores;
(c) curing the UV coating composition to provide a coating on the exterior surface of the cores to form a UV coating layer, the UV coating having an average ultraviolet transmission of less than ten percent and an average near infrared transmission of greater than sixty percent.

33. A process according to claim 32 further comprising agglomerating ultraviolet transparent base particles to form cores.

34. A process according to claim 33 further comprising providing ultraviolet transparent grains, and applying a color coating to the grains to form cores.

35. A process according to claim 32, wherein the UV coating is applied uniformly to the surface of the exterior surface of the cores by a fluidized bed technique.

36. A roofing granule comprising a core comprising an agglomerate comprising base particles and an agglomerate binder, the base particles having an average ultraviolet transmission of greater than about 60 percent and an average near infrared reflectance of greater than about 60 percent, and the agglomerate binder having an average ultraviolet transmission of less than 10 percent and an average transmission in the near infrared and visible ranges of the electromagnetic spectrum of greater than about 60 percent.

* * * * *